(12) United States Patent
Hansen

(10) Patent No.: US 7,658,958 B2
(45) Date of Patent: Feb. 9, 2010

(54) METHOD AND AN APPARATUS FOR PRODUCING ICE CONFECTION

(75) Inventor: Per Henrik Hansen, Malling (DK)

(73) Assignee: Tetra Laval Holding & Finance S.A. (CH)

( * ) Notice: Subject to any disclaimer, the term of this patent is extended or adjusted under 35 U.S.C. 154(b) by 725 days.

(21) Appl. No.: 10/552,523

(22) PCT Filed: Mar. 30, 2004

(86) PCT No.: PCT/DK2004/000220

§ 371 (c)(1),
(2), (4) Date: Oct. 7, 2005

(87) PCT Pub. No.: WO2004/089105

PCT Pub. Date: Oct. 21, 2004

(65) Prior Publication Data

US 2006/0182860 A1    Aug. 17, 2006

(30) Foreign Application Priority Data

Apr. 7, 2003    (DK) ............................... 2003 00531

(51) Int. Cl.
*A23G 9/18* (2006.01)
*A23G 9/24* (2006.01)

(52) U.S. Cl. .................. 426/279; 62/345; 425/112; 425/215; 425/261; 426/282; 426/306; 426/307; 426/515

(58) Field of Classification Search ............... 425/112, 425/215, 261; 426/101, 279, 306, 307, 282, 426/512, 515; 62/345; *A23G 9/14, 9/18, A23G 9/24*

See application file for complete search history.

(56) References Cited

U.S. PATENT DOCUMENTS

| | | | | |
|---|---|---|---|---|
| 1,475,579 | A | * | 11/1923 | Harlan ........................ 425/215 |
| 1,894,077 | A | * | 1/1933 | Winkler et al. .............. 425/215 |
| 2,240,214 | A | * | 4/1941 | Heidelmeyer et al. ....... 425/447 |
| 3,907,472 | A | | 9/1975 | Lutsey |
| 4,501,544 | A | * | 2/1985 | Akutagawa .................. 425/218 |

(Continued)

FOREIGN PATENT DOCUMENTS

EP    1 249 175    10/2002

(Continued)

OTHER PUBLICATIONS

International Search Report; PCT/DK2004/000220; Jul. 12, 2004.

*Primary Examiner*—Robert B Davis
(74) *Attorney, Agent, or Firm*—Cantor Colburn LLP

(57) ABSTRACT

The present invention concerns an apparatus and a method for producing ice confection comprising mold cavities arranged on lamellae disposed in an endless belt along which are arranged process means for the production of the ice confection by conveying the lamellae between the process means, wherein the apparatus comprises an uneven number of lamellae and the process means are arranged along the belt in such a way, that the ice confection production process may be completed by two full circulations of one lamella on the belt. Due to the uneven number of lamellae a specific lamella will change stop position for each circulation. Hereby, a number of advantages are obtained through an optimal utilization of the lower lamella sequence, such that the shortest possible apparatus is obtained.

10 Claims, 1 Drawing Sheet

U.S. PATENT DOCUMENTS

| | | | |
|---|---|---|---|
| 4,505,220 A | * | 3/1985 | Bank et al. .................... 118/16 |
| 4,530,214 A | | 7/1985 | Ellsworth et al. |
| 4,576,562 A | | 3/1986 | Anderson |
| 4,751,806 A | * | 6/1988 | Gram ......................... 426/282 |
| 4,819,449 A | | 4/1989 | Curti et al. |
| 5,180,602 A | * | 1/1993 | Bainbridge et al. ......... 426/515 |
| 6,159,520 A | * | 12/2000 | Aasted ....................... 426/515 |

FOREIGN PATENT DOCUMENTS

| | | |
|---|---|---|
| GB | 1 260 536 | 1/1972 |
| WO | WO 98/00030 | 1/1998 |

\* cited by examiner

METHOD AND AN APPARATUS FOR PRODUCING ICE CONFECTION

TECHNICAL FIELD OF THE INVENTION

The present invention relates to a method and an apparatus for producing ice confection, i.e. ice cream products with a core of ice cream enclosed in a cover, preferably a chocolate shell.

BRIEF SUMMARY OF THE INVENTION

Production of ice confection is in general performed in two ways. According to a first production method the production is performed by extrusion of the ice mass, which is cut into portions with subsequent freezing in cold air. Afterwards, the portion is transferred to a chocolate covering device and then on via a chocolate cooling belt to wrapping and storage. The disadvantage of such a production method is the long freezing requiring around twenty minutes for solidifying the ice mass. Further, the chocolate cover evens out the contours of the shape of the ice cream product, a disadvantage also being that the heat supplied to the ice mass by the chocolate melts part of the ice mass, and thus the quality of the ice product is impaired.

According to another production method the ice confection is moulded in mould cavities. First, a chocolate shell is manufactured by filling in chocolate and emptying surplus chocolate from the mould cavities. Then, partly liquid ice cream is filled into the chocolate shells and a final layer of chocolate is applied after freezing the ice cream in cold air, which layer melts together with the abovementioned chocolate shell. The machine comprises a number of lamellae, which are connected together in an endless belt. Each lamella is provided with a row of cavities or detachable moulds, corresponding to the top and sides of the product. The lamellae are conveyed stepwise by using two chains being moved by means of chain wheels at each end of the belt run. By this machine the following sub-processes are performed successively:

Pre-cooling the empty moulds in a compartment with cold air;
Filling chocolate into the cavities;
Suction of surplus chocolate after part of the chocolate has solidified;
Scraping off chocolate spilled on the top face of the moulds;
Cooling the chocolate shell with cold air;
Filling and levelling ice cream into the chocolate shell;
Cooling the ice cream;
Filling chocolate on the top face of the ice cream;
Removing surplus chocolate;
Scraping off chocolate spilled on the mould plane;
Cooling the chocolate in cold air; and
Extracting the products for wrapping.

Using standard ice cream at a temperature of around −4 to −8° C. a cooling takes place in cold air for cooling the ice cream another approx. 10° C., which takes very a long time, though partly remedied by the fact that the cooling zone is designed very long. There are several drawbacks to this type of machine, as the emptying out and the scraping off occur with the cavities facing upwards. Further, all the processes are performed on the upper sequence of the endless belt (the upper lamellae loop), whereby the entire lower part of the belt is not utilised. This renders the machine very long. However, one design is known in which the mould cavities of the lower part are facing downwards during emptying of surplus chocolate from the top face of the ice cream and during scraping off chocolate from the mould plane. The drawback being the first emptying out and scraping off still occurs with the cavities facing upwards, and the machine is consequently still rendered relatively long.

It is therefore an object of the present invention to provide a faster and better suited production of ice confection in an apparatus which does not take up a large amount of space.

An apparatus and a method for producing ice confection comprises mould cavities arranged on lamellae disposed in an endless belt along which are arranged process means for the production of the ice confection by conveying the lamellae between the process means, wherein the apparatus comprising an uneven number of lamellae and the process means are arranged along the belt in such a way, that the ice confection production process may be completed by two full revolutions of a lamella on the belt.

Due to the uneven number of lamellae, a given lamella will change stop position for each circulation. Hereby, a number of advantages are obtained through an optimal utilization of the lower lamella sequence, such that the shortest possible apparatus is obtained.

By an apparatus according to the invention it is only necessary having one cooling zone, as one common freeze compartment may be provided, while the lamella during one production cycle is moved four times through the compartment, two times in the upper and two times in the lower belt sequence, respectively.

The two chocolate fillings may be performed in the same area and e.g. may be using one common process means. Additionally, the two processes of chocolate emptying and scraping off the moulds are performed with the mould cavities, i.e. the lamellae facing downwards. Thus, it is possible to provide the apparatus with a drain for a shared accumulation for these process steps.

The freezing period for the ice cream and accordingly the size of the freeze compartment may be reduced significantly by the application of a low temperature ice cream, preferably having a temperature from approx. −8 to −15° C. for filling. Said low temperature allows also for the products, after wrapping on subsequent process means, may be taken directly to a freezer storage. The freezing period may also be reduced by cooling the mould cavities of the lamellae with liquid nitrogen, which is applied to the mould cavities for pre-cooling prior to filling of chocolate in the moulds for the production of the chocolate shell. Also, the nitrogen gas produced by this cooling will contribute to the cooling of the production facility in general.

As a substitute for stepwise conveying two lamellae at a time, the conveying of the belt may be continuous at an even speed. Thus the same advantages may be gained, as long as the number of lamellae is uneven and the processes occurs at the predetermined stationary positions relative to the belt and having a process cycle corresponding to every second lamellae.

BRIEF DESCRIPTION OF THE DRAWING

In the following the invention is described in detail referring to the supplied drawings, in which.

DETAILED DESCRIPTION OF THE INVENTION

Figure 1:
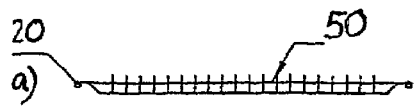
FIGS. 1a and 1b shows a lamella with mould cavities for moulding ice products.
Figure 1:

In FIGS. 1a and 1b are shown a lamella 50 with a number of mould cavities 30 formed or mounted in the lamella 50. Each side of the lamella 50 is connected to a chain 20. The chains 20 surround two rolls or wheel 60 in such a way that the lamellae are disposed in a belt sequence 40, as shown in the following figures. The chains and the lamellae thus together form an endless belt. The lamellae 50 are consequently rotated in a belt sequence 40.

The production of the ice confection products is performed by moulding in mould cavities 30. Firstly, a chocolate shell is produced by filling in chocolate and emptying surplus chocolate from the mould cavities. Then, partly liquid ice cream is filled into the chocolate shells and after freezing in cold air a final layer of chocolate is applied, which melts together with the above mentioned chocolate shell.

Figure 2:
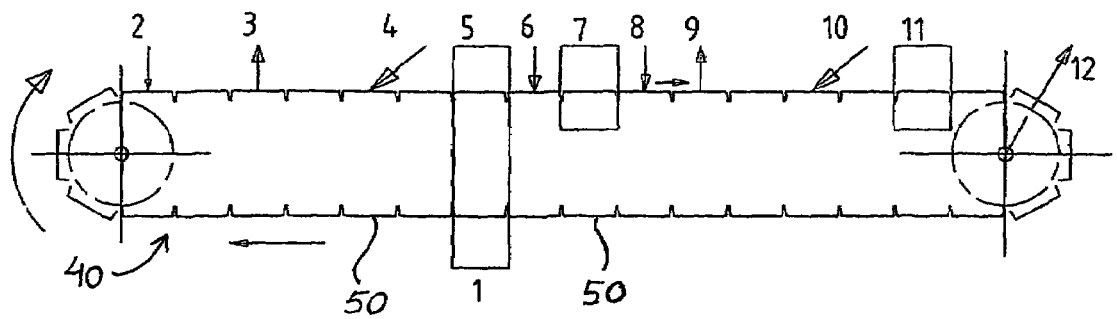
FIGS. 2 and 3 shows two embodiments of the production process known in the art.
Figure 3:
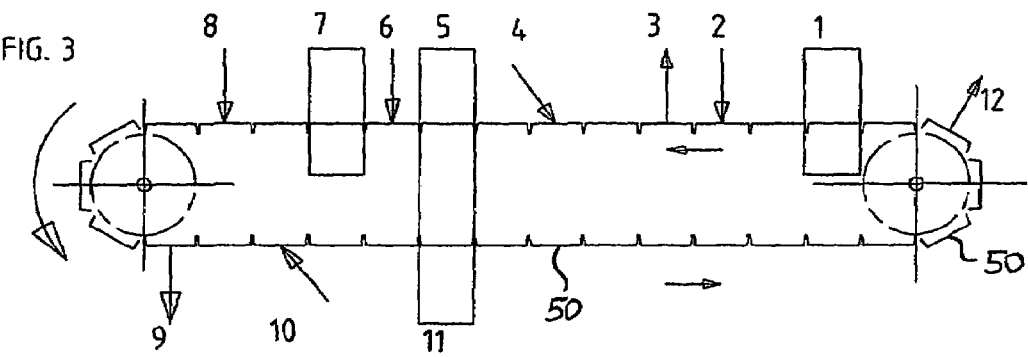
Figure 4:
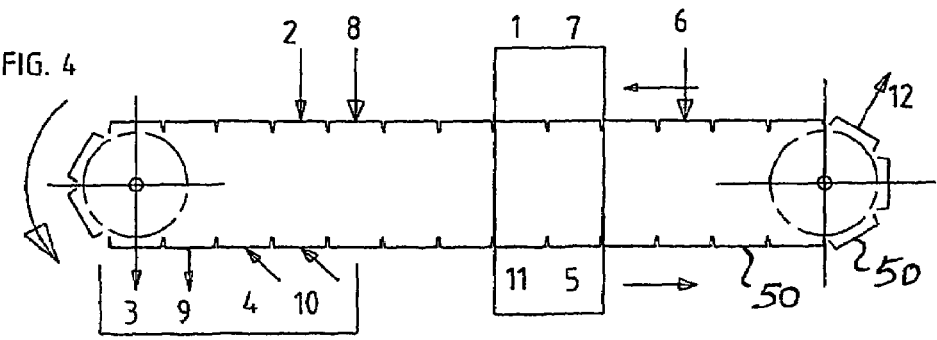
FIG. 4 is a schematic illustration of an apparatus for production of ice confection according to the invention.

In FIGS. 2 to 4 are shown a number of lamellae connected together in an endless belt. Each lamella is provided with a row of cavities or detachable moulds, corresponding to the top and sides of the product. The lamellae are conveyed stepwise by the two chains being moved by means of chain wheels in each end of the belt run. By this production method for producing ice confection the apparatus performs the following sub-processes successively:

1) pre-cooling of the empty moulds in a compartment with cold air;
2) filling of chocolate in the cavities;
3) suction of surplus chocolate after a part of the chocolate has solidified;
4) scraping off chocolate spilled on the top surface of the moulds;
5) cooling the chocolate shell with cold air;
6) filling and levelling ice cream in the chocolate shell;
7) cooling the ice cream;
8) filling chocolate on the top face of the ice cream;
9) removing surplus chocolate;
10) scraping off chocolate spilled on the mould plane;
11) cooling the chocolate in cold air; and
12) extraction of the products for wrapping.

The sub-processes takes place along the belt and the position for the individual sub-processes are shown in FIG. 2 to 4 using the above reference numbers.

Using usual ice cream having a temperature of approx. −4 to −8° C., the cooling takes place in cold air in order to lower the ice cream temperature by another approx. 10° C., which will take a long time, though partly remedied by the fact that the cooling zone is designed very long according to the known art, as shown in FIG. 2. There are several drawbacks to his type of machine, as the extraction 3, 9 and the scraping off 4, 10 occur with the cavities facing upwards. Further, every single process is performed on the upper sequence of the endless belt (the upper lamellae loop), whereby the entire lower part of the belt is not utilised.

According to another design, see FIG. 3, a machine is known in which the mould cavities in lower part have the openings face downwards for emptying 9 and scraping off 10 chocolate from the mould plane. The drawbacks are the first chocolate emptying 3 and scraping off 4 still occurs with the cavities facing upwards, and the machine is consequently still rendered relatively long.

An apparatus according to the invention for producing ice confection is shown in FIG. 4. This design renders the belt 40 and accordingly the entire apparatus significantly shorter, since the process steps are arranged both above and below the lamellae of the belt and since each lamella 50 has to circulate to entire sequences in connection with the production of the ice confection products in it. Due to the uneven number of lamellae a specific lamella will change stop position for each circulation. The belt is, for each process cycle, preferably conveyed stepwise two lamellae at a time. Accordingly, the process means may be arranged such that all freezing processes 1, 7; 5, 11 may be gathered in one common freeze compartment. The two filling processes 2, 8 are arranged in the same area and may possibly be performed by the same process means, if the conditions allow it. The two processes of emptying out the chocolate 3, 9 occur in the beginning of the lower sequence, followed by the corresponding scraping off 4, 10 chocolate of the moulds. Since the mould cavities are facing downwards during emptying out and scraping off one common collection means may be provided, such as a collection tray for these processes. An optimal utilization of the lower lamella sequence is obtained, which provides the shortest possible machine.

The invention claimed is:

1. An apparatus for producing ice confection comprising:
   mould cavities arranged on lamellae disposed in an endless belt along which are arranged process means for the production of the ice confection by conveying the lamellae between the process means,
   wherein the apparatus comprises an uneven number of rows of mould cavities, such as the lamellae disposed in an endless belt, and the process means are arranged along the belt in such a way, that the ice confection production process may be completed by two full revolutions of a specific mould cavity on the belt.

2. An apparatus according to claim 1, wherein there is provided one common process means for pre-cooling empty moulds, cooling of a chocolate shell, cooling of an ice cream and cooling of chocolate, said process means comprising a cooling zone preferably extending over at least an area corresponding to two lamellae on the belt in both an upper and lower sequence.

3. An apparatus according to claim 1, wherein process means for chocolate filling into the cavities and chocolate filling on a top face of ice cream are arranged in a same area along an upper belt sequence.

4. An apparatus according to claim 1, wherein process means for the removal are arranged in a same area along the lower belt sequence.

5. An apparatus according to claim 1, wherein the lamellae in the belt, for each process cycle, are conveyed stepwise two lamellae or rows of mould cavities at a time.

6. An apparatus according to claim 1, wherein the lamellae in the belt, for each process cycle, are conveyed continuously two lamellae or rows of mould cavities at a time.

7. An apparatus according to claim 1, wherein process means for pre-cooling of the mould cavities by means of liquid nitrogen are arranged.

8. A method for producing a covered ice cream product, comprising:
   production of a cover shell in mould cavities on a lamella,
   filling of said shell with ice cream, which after freezing is applied a cover layer melting together with the cover shell,
   said method being completed by movement of a number of lamellae arranged in an endless belt, whereby the individual lamella is moved between process means disposed along said belt,
   wherein the belt comprises an uneven number of rows of mould cavities, such as the lamellae disposed in an endless belt, and the production process of the ice cream product in the mould cavities in a lamella is completed by two full circulations of a specific mould cavity, the belt being conveyed stepwise two lamellae at a time or continuously at an even speed, whereby two rows of mould cavities are conveyed for each function cycle of the production processes.

9. A method according to claim 8, wherein application of a low temperature ice cream of approximately −8 to −15° C. for filling of the ice cream is utilised.

10. An apparatus according to claim 4, wherein said process means for removal comprises means for emptying surplus chocolate after a part of the chocolate has solidified to a shell and for removing surplus chocolate on a top face of ice cream.

* * * * *